Patented Sept. 9, 1924.

1,508,124

UNITED STATES PATENT OFFICE.

LINWOOD T. RICHARDSON, OF MILWAUKEE, WISCONSIN, ASSIGNOR TO THE CUTLER-HAMMER MFG. CO., OF MILWAUKEE, WISCONSIN, A CORPORATION OF WISCONSIN.

PROCESS FOR PRODUCING MOLDED PRODUCTS.

No Drawing. Application filed June 3, 1918. Serial No. 237,903.

*To all whom it may concern:*

Be it known that I, LINWOOD T. RICHARDSON, a citizen of the United States, residing at Milwaukee, in the county of Milwaukee and State of Wisconsin, have invented new and useful Improvements in Processes for Producing Molded Products, of which the following is a full, clear, concise, and exact description.

This invention relates to the production of molded articles comprising or containing a phenolic condensation product.

In practice it has heretofore been customary to hot mold articles comprising or containing phenolic condensation products, and various processes have been proposed for preparing the product for such hot molding. On the other hand, various articles in which the use of phenolic condensation products is very advantageous do not require hot molding and assuming the possibility of so doing, the same could be cold molded with a great saving in expense and time. However, the two methods of molding are radically different and much difficulty has been experienced in suitably preparing articles containing such phenolic condensation products, for cold molding, especially where the condensation product is prepared by hydrous reaction.

The present invention has among its objects to overcome such difficulty and to provide a practicable and economical process whereby cold molding of such articles may be readily accomplished.

Other objects and advantages of the invention will hereinafter appear.

According to the present invention it is proposed to produce a binder by the reaction of phenol or cresol with an aqueous solution of formaldehyde or a polymer thereof in the presence of a small quantity of acid. To this end heat is applied to certain or all of the aforesaid materials to start the reaction and then the supply of heat is discontinued to permit the reaction to proceed automatically until a thin liquid is finally thrown out of solution. Then the mass is boiled until the same thickens, preferably to a resinous state, after which the excess of water is drained off leaving a resinous binder containing an entrapped solution of formaldehyde. This binder is then mixed with a suitable inert filler, such as asbestos, the mixture being preferably made after cooling of the binder and the resulting mix is then preferably dried and ground to a suitable size for molding purposes, for instance, to a size which will pass through a 10-mesh screen. And if the mix is then not sufficiently plastic for molding purposes, it may be moistened with some solvent, such as alcohol, or may be rendered more plastic by warming the same.

Then after preparing the compound as described, it is proposed to introduce the same into suitable molds and to effect molding thereof under high pressure, say, from 3 to 5 tons per square inch, either at room temperature or at a slightly elevated temperature; then remove the molded articles and subject the same to a heat treatment, preferably at atmospheric pressure and under either a gradually increasing temperature or a temperature which is elevated from time to time until the desired maximum temperature is reached.

A satisfactory product may be obtained by combining cresol, 100 parts, concentrated hydrochloric acid, 2 parts, and a 40% formaldehyde solution, 50 parts, to react to produce an incomplete condensation product, then cooling such product and adding thereto a solution of hexamethylene tetramine made by neutralizing 75 parts of formaldehyde with ammonia and then mixing the binder thus produced, with a suitable filler. On the other hand, it is also possible to separately mix the condensation product and the hexamethylene tetramine with the filler and to use hexamethylene tetramine in a solid form instead of in solution.

The proposed process provides for production of a mixture of an inert filler, an incomplete condensation product, and a compound containing a reactive methylene group which is present in sufficient quantity to form a complete condensation product and to thereby give the final molded product a degree of strength and heat resistance adapting the same to various uses, particularly for electrical insulation.

In practice it has been found that the reaction may be more readily controlled if the cresol and acid are heated alone to the reacting temperature and the formaldehyde then added in small portions, each portion being allowed to react before the next is added but this practice need not necessarily be followed. Also, it has been found that the acid may be mixed with the formaldehyde instead of the cresol.

Further, it has been found in practice that it is desirable to begin the heat treatment of the molded articles in the neighborhood of 100° F. and to thereafter gradually raise the temperature to about 350° F. the treatment being usually continued for several hours, depending upon the shape and size of the articles.

What I claim as new and desire to secure by Letters Patent is:

1. The process of producing articles containing a phenolic condensation product which comprises; causing an initial reaction between a phenolic body and a methylene body under conditions insuring formation of an incomplete condensation product wherein substantially one half the phenolic body present is uncombined with methylene substance, mixing the product so obtained with a body comprising filler, subjecting the mixture to a molding operation at ordinary temperature and subsequently heat treating the molded product to effect substantially complete combination of the phenolic content thereof with methylene substance.

2. The process of producing articles containing a phenolic condensation product which comprises; causing an initial reaction between a phenolic body and a methylene body under conditions insuring formation of an incomplete condensation product wherein substantially one half the phenolic body present is uncombined with methylene substance, mixing the product so obtained with a body comprising filler, drying, disintegrating and preliminarily warming the mixture, subjecting the mixture to a molding operation at ordinary temperature and subsequently heat treating the molded product.

3. The process of producing articles containing a phenolic condensation product which comprises; causing an initial reaction between a phenolic body and a methylene body, in proportions affording substantially two phenolic groups to each methylene group, mixing the product so obtained with a body comprising an inert filler and a substance capable of affording in the mixture substantially one methylene group to each phenolic group, subjecting the mixture to a molding operation at ordinary temperature and subjecting the molded product to a prolonged heat treatment for completing the reaction.

4. The process of producing articles containing a phenolic condensation product which comprises; causing reaction between a phenolic body and a methylene body in proportions providing substantially two phenolic groups to each methylene group, mixing the reaction product with an inert filler and with an additional quantity of methylene substance sufficient to provide substantially one methylene group to each phenolic group present, incorporating in the mixture a suitable solvent, subjecting such mixture to a quick molding operation and subsequently heat treating the molded product.

5. The process of producing articles containing a phenolic condensation product which comprises; causing a reaction, in the presence of a condensing agent, of a phenolic body and a methylene body in such proportions as to provide for combination of only substantially one-half of the phenolic body with methylene substance, mixing the product so obtained with an inert filler and with sufficient methylene substance to provide for subsequent combination of the remainder of the phenolic body, subjecting the mixture to a drying operation, cold molding the mixture and subsequently heat treating the molded product.

6. The process of producing articles containing a phenolic condensation product which comprises; causing a reaction, in the presence of a condensing agent and a retarding agent, of a phenolic body and a methylene body in such proportions as to leave substantially one-half of the phenolic body uncombined, incorporating in such product a suitable inert filler and a sufficient body of methylene substance to provide for combination of the formerly uncombined portion of the phenolic body, subjecting the mixture to cooling, drying and disintegrating operations, preliminarily warming such mixture, subjecting the warmed mixture to a quick molding operation at ordinary temperature and finally subjecting the molded product to a heat treatment for completing the reaction.

7. The process of producing articles containing a phenolic condensation product which comprises; causing a reaction, in the presence of a condensing agent, of a phenolic body and a methylene body in proportions providing substantially two phenolic groups to each methylene group present, the methylene body being added in small portions and each portion being allowed to react before addition of the next; mixing the reaction product with an inert filler and a substance capable of providing sufficient methylene groups to react with the uncombined phenolic groups; cold molding the mixture and subsequently heat treating the molded product to complete the reaction.

8. The process of producing articles containing a phenolic condensation product which comprises; causing a succession of similar reactions, in the presence of a condensing agent, of a phenolic body and a methylene body in such proportions as to form an incomplete condensation product containing substantially two phenolic groups to each methylene group present, mixing the product so obtained with an inert filler and a substance capable of providing sufficient methylene groups to react with substantially all the uncombined phenolic groups, subjecting the mixture to a quick molding operation at ordinary temperature and subsequently heat treating the molded product to complete the reaction.

9. The process of producing articles containing a phenolic condensation product which comprises; causing a reaction in the presence of a condensing agent, of a phenolic body and a methylene body in such proportions as to provide substantially two phenolic groups to each methylene group, mixing the product with an inert filler and a substance capable of providing sufficient methylene groups to combine with the uncombined phenolic groups, and adapted to react anhydrously therewith, cold molding the mixture and subsequently heat treating the molded product to complete the reaction.

10. The process of producing articles containing a phenolic condensation product which comprises; causing an initial reaction in the presence of a condensing agent, of a phenolic body and a methylene body, in such proportions as to provide substantially two phenolic groups to each methylene group present, mixing the product so obtained with an inert filler and a substance capable of furnishing sufficient methylene substance to react with the uncombined phenolic groups and adapted to react anhydrously therewith, subjecting the mixture to a drying operation, cold molding the mixture and subsequently heat treating the molded product after completing such molding operation.

11. The process of producing articles containing a phenolic condensing product which comprises causing an initial reaction in the presence of a condensing agent, of a phenolic body and a methylene body in such proportions as to provide substantially two phenolic groups to each methylene group present, mixing the product so obtained with an inert filler and incorporating a sufficient amount of methylene substance to render the number of methylene groups of the mixture substantially equal to the number of phenolic groups thereof, cold molding the mixture and subsequently heat treating the molded product to effect substantially complete combination of the several groups present.

12. The process of producing articles containing a phenolic condensation product which comprises causing an initial reaction in the presence of a condensing agent, of a phenolic body and a methylene body in such proportions as to provide substantially twice as many phenolic groups as methylene groups, mixing the product so obtained with an inert filler and introducing substantially without chemical reaction sufficient methylene substance to substantially double the number of methylene groups present, molding the mixture at a temperature less than the reaction temperature of its ingredients and subsequently heat treating the molded product to complete the reaction.

In witness whereof, I have hereunto subscribed my name.

LINWOOD T. RICHARDSON.